United States Patent

Akagawa et al.

[11] Patent Number: 5,744,535
[45] Date of Patent: Apr. 28, 1998

[54] POLYPROPYLENE RESIN COMPOSITION FOR EXTERIOR PARTS OF AUTOMOBILE

[75] Inventors: Tomohiko Akagawa; Ikunori Sakai; Shigehiro Asano, all of Sakai, Japan

[73] Assignee: UBE Industries, Ltd., Yamaguchi, Japan

[21] Appl. No.: 727,105

[22] Filed: Oct. 8, 1996

[30] Foreign Application Priority Data

| Oct. 9, 1995 | [JP] | Japan | 7-261707 |
| Sep. 11, 1996 | [JP] | Japan | 8-240101 |
| Sep. 30, 1996 | [JP] | Japan | 8-258007 |

[51] Int. Cl.$^6$ ............................................. C08K 3/34
[52] U.S. Cl. .................. 524/451; 524/505; 525/88; 525/95; 525/240; 525/342
[58] Field of Search .......................... 524/451, 505; 525/240, 88, 95

[56] References Cited

U.S. PATENT DOCUMENTS

| 4,621,114 | 11/1986 | Watanabe | 524/451 |
| 5,308,908 | 5/1994 | Fukui | 524/451 |
| 5,391,618 | 2/1995 | Yamamoto | 528/88 |
| 5,532,309 | 7/1996 | Fukui | 524/451 |

FOREIGN PATENT DOCUMENTS

| 0 557 124 | 8/1993 | European Pat. Off. |
| 0 574 114 | 12/1993 | European Pat. Off. |
| 0 646 624 | 4/1995 | European Pat. Off. |
| 0 657 500 | 6/1995 | European Pat. Off. |
| 60-13838 | 1/1985 | Japan |
| 5-59251 | 3/1993 | Japan |
| 5-98093 | 4/1993 | Japan |
| 5-98098 | 4/1993 | Japan |
| 6-504808 | 6/1994 | Japan |
| 6-192500 | 7/1994 | Japan |
| 6-248156 | 9/1994 | Japan |
| 7-102126 | 4/1995 | Japan |
| 7-145272 | 6/1995 | Japan |
| 7-145298 | 6/1995 | Japan |

*Primary Examiner*—Fred Zitomer
*Attorney, Agent, or Firm*—Finnegan, Henderson, Farabow, Garrett & Dunner, L.L.P.

[57] ABSTRACT

A polypropylene resin composition having a high moldability and capable of forming therefrom shaped articles having excellent surface hardness, thermal deformation resistance and low temperature impact resistance includes (A) 35–74 wt % of a crystalline ethylene-propylene block copolymer with an ethylene content of 0.5–15 wt %, an isotactic pentad fractional propylene of 96% or more and a MFR of 40–80 g/10 min. (230° C., 2160 g); (B) 21–40 wt % of an ethylene-α-olefin copolymer produced by using a single site catalyst and having an α-olefin content of 70 mol % or more, a ratio (Mw/Mn) of 2.5 or less, and a ratio ($MI_{10}/MI_{2.16}$) of 6 to 15; and (C) 5–25 wt % of a talc particle component having an average particle size of 3–7 μm.

4 Claims, No Drawings

POLYPROPYLENE RESIN COMPOSITION FOR EXTERIOR PARTS OF AUTOMOBILE

BACKGROUND OF THE INVENTION

1. Field of the Invention

The present invention relates to a polypropylene resin composition for exterior parts of automobiles. More particularly, the present invention relates to a polypropylene resin composition useful for exterior parts of automobiles, having excellent surface hardness, resistance to thermal deformation, impact resistance at low temperature and moldability and capable of forming shaped articles having a good appearance.

The polypropylene resin composition of the present invention is advantageously usable for exterior parts of automobiles, typically a large, thin bumper which must be produced from a resin composition having a high melt-flowability.

2. Description of Related Art

It is known that various polypropylene resin materials are employed to produce bumpers of automobiles, in consideration of lightness and design options.

The conventional resin compositions for bumpers, as disclosed in Japanese Unexamined Patent Publications No. 57-55,952, No. 58-111,846, No. 59-98,157, No. 58-17,139, No. 57-177,038, No. 57-207,630, No. 57-195,134, No. 57-159,841 and No. 55-21,494, include an ethylene-propylene copolymer resin or an inorganic filler, for example, talc dispersed in a polypropylene resin matrix. However, these conventional resin compositions are unsatisfactory in surface hardness and melt-flowability (moldability).

Also, Japanese Unexamined Patent Publications No. 60-13,838, No. 05-59,251, No. 05-98,093 and No. 05-98,098 disclose an improvement in polypropylene resin and a selection of ethylene-α-olefin copolymers for the purpose of enhancing the surface hardness and the moldability of the polypropylene resin composition. These compositions exhibit enhanced surface hardness and moldability. However, the enhanced surface hardness and moldability are still unsatisfactory.

Currently, polypropylene resin materials for the exterior parts, typically bumpers, of automobiles are required to be capable of forming shaped articles having a good appearance, in addition to having excellent rigidity, impact strength and moldability. Particularly, in view of the current demands for large and thin bumpers in various designs, there is a strong demand for improvements in melt-flowability of the propylene resin composition, and in the resistance of the surfaces of the resultant shaped articles to scratches, namely the surface hardness of the shaped articles.

SUMMARY OF THE INVENTION

An object of the present invention is to provide a polypropylene resin composition having a high melt flowability and capable of forming a shaped article having excellent surface hardness, resistance to thermal deformation and impact resistance at low temperature, and which is thus useful for exterior parts of automobiles.

Another object of the present invention is to provide a polypropylene resin composition capable of forming a shaped article with a good appearance without flowmark formation, and which is thus useful for exterior parts of automobiles.

The above-mentioned objects can be attained by the polypropylene resin composition of the present invention which comprises:

(A) 35 to 74% by weight of a crystalline ethylene-propylene block copolymer having a content of copolymerized ethylene of 0.5 to 15% by weight, an isotactic pentad fraction (mmmm) of copolymerized propylene of 96% or more, and a melt flow rate of 40 to 80 g/10 minutes determined at a temperature of 230° C. under a load of 2160 g;

(B) 21 to 40% by weight of an ethylene-α-olefin copolymer, prepared by catalytic polymerization in the presence of a single-site catalyst, containing 70 molar % or less of copolymerized α-olefin and having a molecular weight distribution ratio (Mw/Mn), of a weight-average molecular weight (Mw) to a number-average molecular weight (Mn) of 2.5 or less, and a melt flow index ratio [$MI_{10}/MI_{2.16}$] of a melt flow index ($MI_{10}$) determined at 190° C. under a load of 10 kg to a melt flow index ($MI_{2.16}$) determined at a temperature of 190° C. under a load of 2.16 kg of 6 to 15; and (C) 5 to 25% by weight of talc particles having an average particle size of 3 to 7 μm, determined by a laser diffraction method.

DESCRIPTION OF THE PREFERRED EMBODIMENTS

The inventors of the present invention carefully studied ethylene-α-olefin copolymers to be added as an impact resistance-enhancing component to a crystalline ethylene-propylene block copolymer component, to provide a polypropylene resin composition satisfactory in the above-mentioned characteristics.

As a result, it was found that when a specific ethylene-α-olefin copolymer produced by polymerization in the presence of a specific catalyst and having specific composition and physical properties is blended to a crystalline ethylene-propylene block copolymer component and a talc particle component, the resultant polypropylene resin composition has a high melt fluidity and is capable of forming a shaped article having excellent surface hardness, resistance to thermal deformation, impact resistance at low temperature and which exhibits a good appearance free from flowmarks. The present invention was completed on the basis of the above-mentioned finding.

The components (A), (B) and (C) of the polypropylene resin composition of the present invention will be explained in detail below.

Component (A)

The crystalline ethylene-propylene block copolymer usable as a component (A) is prepared by procedures comprising a first step wherein a crystalline propylene homopolymer is prepared and a second step wherein the crystalline propylene homopolymer is copolymerized with ethylene and propylene to provide an ethylene-propylene block copolymer. Each of the homopolymerization in the first step and the copolymerization in the second step is carried out in the presence of a catalyst, for example, a Zieglor-Natta catalyst comprising titanium trichloride in combination with an alkyl aluminum compound or a composite catalyst comprising a magnesium compound and a titanium compound.

The crystalline ethylene-propylene block copolymer has a content of copolymerized ethylene of 0.5 to 15% by weight, preferably 1.0 to 10% by weight, an isotactic pentad fraction (mmmm) of copolymerized propylene of 96% or more, preferably 97% or more, and a melt flow rate (MFR) of 40 to 80 g/10 minutes, preferably 50 to 70 g/10 minutes, determined at a temperature of 230° C. under a load of 2160 g.

The content of the copolymerized ethylene in the ethylene-propylene block copolymer is determined by subjecting a specimen consisting of a film made from the copolymer by a press-forming procedure to infra-red spectrophotometry in which the absorbances (characteristic absorptions) of methyl groups C—$CH_3$, 1155 $cm^{-1}$) and methylene groups (—$CH_2$—) appearing in the infra-red adsorption spectrum are measured, and determining the content from the absorbances by using a Gardner's calibration curve (I. J. Gardner et al., Rubber Chem. Tech. 44, 1015 (1971)).

If the copolymerized ethylene content in the ethylene-propylene block copolymer for the component (A) is less than 5% by weight, the shaped article of the resultant polypropylene resin composition exhibits an unsatisfactory impact strength. Also, if the content is more than 15% by weight, the shaped article of the resultant polypropylene resin composition exhibits significantly reduced thermal deformation resistance and surface hardness.

The isotactic pentad fraction (mmmm) of the copolymerized propylene refers to a content of propylene monomer units located in the center portions of series chain composed of five propylene monomers successively metho-bonded to each other, which chain is an isotactic series chain consisting of pentad units in a crystalline polypropylene molecular chain, and is measured by using 13C-NMR. Particularly, the mmmm is determined as an mmmm peak fraction included in the entire absorption peaks of methyl carbon band in the 13C-NMR spectrum.

If the mmmm is less than 96%, the shaped article of the resultant polypropylene resin composition is unsatisfactory in rigidity and the surface hardness thereof.

If the MFR of the ethylene-propylene block copolymer is less than 40 g/10 minutes, the resultant polypropylene resin composition exhibits unsatisfactory melt-fluidity and moldability. Also, if the MFR is more than 80 g/10 minutes, the shaped article of the resultant polypropylene resin composition exhibits an unsatisfactory impact resistance.

The crystalline ethylene-propylene block copolymer component (A) is contained in a content of 35 to 74% by weight, preferably 40 to 65% by weight in the polypropylene resin composition of the present invention.

If the content of the component is less than 35% by weight, the resultant polypropylene resin composition exhibits unsatisfactory flexual modulus- and surface hardness-enhancing effects on the shaped article. Also, if the content of the component (A) is more than 74% by weight, the resultant polypropylene resin composition exhibits an unsatisfactory impact resistance enhancing effect on the shaped article.

Component (B)

The ethylene-α-olefin copolymer usable as the component (B) is advantageously produced by a catalytic polymerization in the presence of a single site catalyst. The single site catalyst comprises at least one member selected from metallocene compounds of transition metals of Groups IV and V of the Periodic Table and at least one member selected from the group consisting of organic aluminum compounds and organic ionic compounds.

The transition metals for the metallocene compounds are preferably selected from titanium (Ti), zirconium (Zr), hafnium (Hf) and vanadium (V).

The metallocene compounds usable for the preparation of the ethylene-α-olefin copolymers of the present invention may be selected from conventional metallocene compounds, for example, those comprising, as ligands, a pair of cyclopentadienyl groups, substituted cyclopentadienyl groups with at least one substituent, for example, an alkyl group, for example, methyl, dimethyl or pentamethyl groups, indenyl groups or fluorenyl groups. The cyclopentanyl or substituted cyclopentadienyl groups may be cross-linked with a hydrocarbyl group, for example, alkylene or substituted alkylene group, hydrocarbylsilicon group, for example, silanylene group, substituted silanylene group, silalkylene group or substituted silalkylene group. The cross-linked cyclopentadienyl or substituted cyclopentadienyl groups may be further cross-linked with an oxygen, nitrogen or phosphorus atom to form, for example, an oxasilanylene, substituted oxasilanylene, oxasilalkylene, aminosilyl, mono-substituted aminosilyl, phosphinosilyl, or mono-substituted phosphinosilyl group.

The metallocene compounds usable for the preparation of the ethylene-a-olefin copolymer of the present invention include those disclosed, for example, in Japanese Unexamined Patent Publications No. 58-19,309, No. 60-35,006, No. 61-130,341, No. 61-264,010, No. 61-296,008, No. 63-222, 177, No. 63-251,405, No. 1-66,214, No. 1-74,202, No. 1-275,609, No. 1-301,704, No. 1-319,489, No. 2-41,303, No. 2-131,488, No. 3-12,406, No. 3-139,504, No. 3-179, 006, No. 3-185,005, No. 3-188,092, No. 3-197,514, No. 3-207,703, and No. 5-209,013, and PCT (Japan) Publications No. 1-501,950, No. 1-502,036 and No. 5-505,593.

Alternatively, the metallocene compounds usable for the preparation of the ethylene-α-olefin copolymer of the present invention include those disclosed in Japanese Unexamined Patent Publications No. 61-180,314, No. 61-264, 010, No. 63-142,004, No. 1-129,004, No. 1-301,704, No. 2-75,605, No. 3-12,406, No. 3-12,407, No. 4-227,708, No. 4-268,308, No. 4-300,889, and No. 6-25,343.

The metallocene compounds comprise a pair of cross-linking or multi-substitutional ligands capable of forming a complex having a $C_2$ symmetrical structure. Preferable examples of the metallocene compounds are silicon-cross-linked metallocene compounds, for example, dimethylsilyl (2,4-dimethylcyclopentadienyl)-(3',5'-dimethylcyclopentadienyl)zirconium dichloride, dimethylsilyl(2,4-dimethylcyclopentadienyl)(3',5'-dimethylcyclopentadienyl) hafnium dichloride; and indenyl-cross-linked metallocene compounds, for example, ethylenebisindenyl zirconium dichloride, ethylenebisindenyl hafnium dichloride, ethylenebis(methylindenyl) zirconium dichloride and ethylenebis(methylindenyl) hafnium dichloride.

The organic aluminum compounds to be employed, as a catalyst component, in combination with the metallocene compound are preferably selected from the straight chain or cyclic polymeric aluminum oxide compounds of the formula:

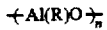

wherein R represents a member selected from hydrocarbon groups having 1 to 10 carbon atoms and substituted hydrocarbon groups with at least one substituted selected from halogen atoms and —OR group wherein R is as defined above, n represents an integer of 5 or more, more preferably 10 or more.

The organic aluminum oxide compound is preferably selected from methyl alumoxane (R=methyl), ethyl alumoxane (R=ethyl) and isobutyl alumoxane (R=isobutyl).

Alternatively, the organic aluminum compound is selected from trialkylaluminums, dialkylhalogenoaluminums, sesquialkylhalogenoaluminums, alkenylaluminums, dialkylhydroaluminums and sesquialkylhydroaluminums. Concrete examples of these organic aluminum compounds usable as a catalyst component for the preparation of the specific ethylene-α-olefin copolymer of the present invention are trialkylaluminums, for example, trimethylaluminum, triethylaluminum, triisobutylaluminum, trihexylaluminum, and trioctylaluminum; dialkylhalogenoaluminums, for example, dimethylaluminum chloride and diethylaluminum chloride; sesquialkylhalogenoaluminums, for example, sesquiethylaluminum chloride; and ethylaluminum dichloride, diethylaluminum hydride, and sesquiethylaluminum hydride. These organic aluminum compounds may be used in combination of the organic aluminum oxide compounds.

The organic ionic compounds to be used in combination of the metallocene compounds are represented by the formula:

$$C^+A^-$$

wherein $C^+$ represents an oxidative cation derived from organic compounds, organic metal compounds or inorganic compounds or a Brensted acid residue formed from a Lewis acid and protons, and $A^-$ represents a non-coordinative anion.

The cation $C^+$ reacts with the anionic ligands of the metallocene compound to form a metallocene cation. The anion $A^-$ is not coordination-reactive with the metallocene compound and thus can stabilize the metallocene cation. The organic ionic compounds usable, as a catalyst component, for the preparation of the ethylene-α-olefin copolymer of the present invention include those as disclosed in Japanese Unexamined Patent Publications No. 4-253,711 and No. 4-305,585 and PCT (Japan) Publications No. 5-507,756 and No. 5-502,906. Particularly, ionic reaction product of a tetrakis(pentafluorophenyl) borate anion with a triphenylcarbonium cation or dialkylanilium cation is useful as the organic ionic compound. The organic ionic compounds may be used together with the organic aluminum compounds.

The copolymerization of ethylene with at least one α-olefin in the presence of a single site catalyst can be effected by a conventional copolymerization method, for example, a gas phase fluidized bed copolymerization or agitation copolymerization method in an inert gas atmosphere, a slurry copolymerization method in an inert liquid medium, or a bulk copolymerization method utilizing the monomers to be copolymerized as a reaction medium.

The copolymerization is carried out usually at a temperature of 10° to 150° C., preferably 20° to 90° C., for a polymerization time of 0.1 to 10 hours.

Where a single site catalyst comprising a metallocene compound and an organic aluminum compound is used, these two catalytic ingredients are used preferably in an atomic ratio of aluminum atoms in the aluminum compound to the transition metal atoms in the metallocene compound of 10 to 100,000, more preferably 10 to 1,000.

Also, where a single site catalyst comprises a metallocene compound and an organic ionic compound, these two catalytic ingredients are used preferably in a molar ratio of the ionic compound to the transition metal in the metallocene compound of 0.1 to 50, more preferably 0.5 to 5.

In the polypropylene resin composition of the present invention, the ethylene-α-olefin copolymer for the component (B) has a content of copolymerized α-olefin of 70 molar % or less, preferably 50 molar % or less, more preferably 3 to 30 molar %. If the copolymerized α-olefin content is more than 70 molar %, the resultant polypropylene resin composition exhibits an unsatisfactory melt-flowability.

In the polypropylene resin composition of the present invention, the ethylene-α-olefin copolymer for the component (B) has a molecular weight distribution ratio (Mw/Mn) of a weight-average molecular weight (Mw) to a number-average molecular weight of 2.5 or less, more preferably, 1.5 to 2.2.

If the ratio (Mw/Mn) is more than 2.5, the resultant component (B) exhibits an unsatisfactory compatibility with the component (A) and the component (C), and thus the resultant shaped polypropylene resin composition article exhibits a reduced impact resistance.

In the polypropylene resin composition of the present invention, the ethylene-α-olefin copolymer has a melt flow index ratio $[MI_{10}/MI_{2.16}]$ of a melt flow index ($MI_{10}$) determined at a temperature of 190° C. under a load of 10 kg to a melt flow index ($MI_{2.16}$) determined at a temperature of 190° C. under a load of 2.16 kg of 6 to 15, preferably 6.5 to 10.

The melt flow index ($MI_{2.16}$) of the ethylene-α-olefin copolymer at a temperature of 190° C. under a load of 2.16 kg is preferably 0.1 to 50 g/10 minutes, more preferably 0.3 to 30 g/10 minutes. If the $MI_{2.16}$ is less than 0.1 g/10 minutes, the resultant resin composition may have an unsatisfactory melt-flowability and dispersability in the crystalline ethylene-propylene block copolymer component (A), and thus the resultant shaped article has an unsatisfactory impact resistance. If the $MI_{2.16}$ is more than 50 g/10 minutes, the resultant resin composition may exhibit an unsatisfactory impact resistance-enhancing effect.

If the melt flow index ratio ($MI_{10}/MI_{2.16}$) is less than 6, the resultant shaped polypropylene resin composition article exhibits an insufficient impact resistance. Also, if the melt flow index ratio ($MI_{10}/MI_{2.16}$) is more than 15, the resultant polypropylene resin composition exhibits an unsatisfactory melt-flowability (moldability).

The ethylene-α-olefin copolymer component (B) is in a content of 20 to 40% of weight based on the total weight of the resin composition. If the content is less than 20% by weight, the impact resistance-enhancing effect for the polypropylene resin composition is insufficient. Also, the content is more than 40% by weight, the shaped article of the resultant polypropylene resin composition exhibits unsatisfactory rigidity and thermal deformation resistance.

In the polypropylene resin composition of the present invention, the specific ethylene-α-olefin copolymer may be used together with an additional elastomer resin, for example, conventional ethylene-α-olefin copolymer rubber prepared by using a conventional polymerization catalyst, for example, a conventional vanadium catalyst or titanium catalyst, a hydrogenation product of ethylene-butadiene block copolymer, or a hydrogenated polybutadiene block copolymer, which are well known as a rubber material, unless the additional elastomer resin affect on the characteristic performances of the polypropylene resin composition.

Talc component (C)

In the polypropylene resin composition of the present invention, specific talc particles (C) having an average particle size of 3 to 7 μm preferably 3 to 5 μm measured by a laser diffraction method, are employed.

If the average particle size of the talc component (C) is less than 3 μm, the talc particles have a low average aspect ratio and thus exhibit an insufficient rigidity-enhancing effect. Also, if the average particle size is more than 7 μm, the resultant polypropylene resin composition exhibits unsatisfactory impact-resistance and rigidity-enhancing effect.

The average particle size of the talc particles is determined by using a microtrack particle size distribution meter (Model: 7995-40DRA, made by Nikkiso K. K.) in accordance with the Fraunhofer diffraction formula for front-scattering laser rays and the side-scattering halogen ray intensity diffraction formula.

In the polypropylene resin composition of the present invention, the talc particle component (C) is employed in a content of 5 to 25% by weight, preferably 7 to 20% by weight.

If the talc component (C) is employed in an amount less than 5% by weight, the rigidity-enhancing effect thereof is insufficient. If the content of the talc component (C) is more than 25% by weight, the resultant polypropylene resin composition exhibits a reduced melt-flowability and moldability and undesirable flowmarks are formed on the shaped article so as to make the appearance of the shaped article bad.

The talc component (C) usable for the present invention can be produced by milling rough talc stones with a conventional mill, for example, a roller mill or a crusher to approach the target average size of the talc particles, and thereafter, classifying the milled talc particles by using a conventional dry classifying machine to remove particles having a size larger than the target size of from 3 to 7 μm. Alternatively, the milled talc particles are further milled by a conventional grinder and then the further milled particles are classified.

The talc particles of the component (C) may be surface-treated with at least one of various conventional surface-treating agents, unless the object of the present invention is hindered. The surface-treatment includes chemical and physical treatments with various surface-treating agents selected from silane-coupling agents, higher fatty acid compounds, fatty acid metal salts compounds, unsaturated organic acids and derivatives thereof, organic titanate compounds and resin acid compounds.

In the preparation of the polypropylene resin composition of the present invention, the crystalline ethylene-propylene copolymer component (A), the ethylene-α-olefin copolymer component (B), the talc component (C), optionally the additional-elastic resin are blended in desired contents by a conventional blending method and apparatus, for example, a Henschel mixer, a V-blender or a ribbon blender; and the blend is melt-kneaded by a conventional method or apparatus, for example, a monoaxial extruder, biaxial extruder, a special biaxial extruder equipped with a feed inlet in the cylinder portion in addition to a usual feed inlet, a kneader or a Banbury mixer, and then pelletized.

In order to further enhance the performance of the shaped articles produced from the polypropylene resin composition of the present invention or to impart specific properties to the shaped articles, an additive comprising at least one member selected from, for example, antioxidants, ultraviolet ray absorbers, photostabilizers, pigments, dispersing agents, painting property-improving agents, moldability-improving agents, antistatic agents, lubricants, nucleators, and releasers, may be added to the polypropylene resin composition, during or after the preparation thereof. Particularly, the antioxidants, ultraviolet ray absorbers, photostabilizers or pigments are preferably added to the polypropylene resin composition of the present invention.

The antioxidants usable for the polypropylene resin composition of the present invention include 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylaniline)-2,4-bisoctyl-thio-1,3,5-triazine, n-octadecyl-3-(4'-hydroxy-3',5'-di-tert-butylphenyl) propionate, tris-(2-methyl-4-hydroxy-5-tert-butylphenyl) butane, tetrakis-[methylene-3-(3',5'-di-tert-butyl-4'-hydroxyphenyl) propionate] methane, 1,3,5-trimethyl-2,4,6-tris(3,5-di-tert-butyl-4-hydroxybenzyl) benzene, and dilauryl-thio-dipropionate.

The ultraviolet ray absorbers and photostabilizers usable for the present invention include 2-hydroxy-4-n-octoxybenzophenone, 2-hydroxy-4-octadecyloxybenzophenone, 4-dodecyloxy-2-hydroxybenzophenone, 2-(2'-hydroxy-3'-tert-butyl-5'-methylphenyl)-5-chlorobenzotriazole, bis-(2,2,6,6-tetramethyl-4-piperidyl) sebacate, 1,2,3,4-butanetetracarboxylic acid-1,2,2,66-penta-methyl-4-piperidinoltridecylalcohol condensates.

The polypropylene resin composition of the present invention preferably exhibits a melt flow rate (MFR) of 10 g/10 minutes or more, more preferably 15 to 50 g/10 minutes, determined at a temperature of 230° C. under a load of 2160 g, a flexural modulus of elasticity (FM) of 1560 MPa or more, more preferably 1580 to 2500 MPa, a tensile yield strength (TYS) of 19 MPa or more, more preferably 20 to 30 MPa, an Izod impact strength (IZOD) of 70 J/m or more, more preferably 75 J/m or more, a thermal deformation temperature of 125° C. or more, more preferably 128° C. or more, a surface hardness (RH) of 55 or more, more preferably 58 to 78, a brittle temperature of -25° C. or less, more preferably -28° C. or lower, and a melt-flowability of 100 cm or more, more preferably 110 cm or more.

EXAMPLES

The present invention will be further illustrated by the following examples which are merely representative and do not in any way restrict the scope of the present invention.

In the examples, the following tests were effected.

For the tests, test pieces were prepared from resin compositions by using an injection molding apparatus (model: J100SAII, made by Nihon Seiko K. K.) at a cylinder temperature of 230° C. and at a mold temperature of 40° C.

TESTS (1) Melt flow rate (MFR)

The melt flow rate measurement of the resin composition was carried out in accordance with ASTM D 1238, at a temperature of 230° C. under a load of 2160 g.

(2) Tensile yield strength (TYS)

The tensile yield strength measurement was carried out in accordance with ASTM D 638.

(3) Flexural modulus of elasticity (FM)

The flexural modulus measurement is carried out in accordance with ASTM D 790.

(4) Thermal deformation temperature (HDT)

The measurement of thermal deformation temperature is carried out in accordance with ASTM D 648, under a fiber stress of 4.6 kg/cm$^2$.

(5) Surface hardness

The measurement of surface hardness is carried out in accordance with ASTM D 785, using a steel ball R. The test result was indicated in accordance with the R scale.

(6) Izod impact strength (IZOD)

The measurement of Izod impact strength was carried out in accordance with ASTM D 256, at a temperature of -30° C.

(7) Brittle temperature (BT)

The measurement of brittle temperature was carried out in accordance with ASTM D 746.

(8) Moldability

The moldability (melt-flowability) was measured by inject-molding a resin composition at a temperature of 230°

C. into a resin flow distance measurement mold having a spiral molding channel having a thickness of 3 mm, a width of 10 mm and a length of 2000 mm and measuring a distance of flow of the resin composition melt.

(9) Gloss

A flat rectangular specimen having a thickness of 3 mm, a length of 75 mm and a width of 150 mm was molded by using a mirror-finished mold by an injection molding method. The injection molding was carried out by using an injection molding machine (Model: M100SJ, made by (K. K.) Meiki Seisakusho) was employed at a cylinder temperature of 210° C. and at a mold temperature of 40° C.

The gloss of the specimen was measured at a center portion of the specimen by using a digital varied angle glossmeter (Model: VG-1D, made by Nihon Denshokukogyo K. K.) in accordance with Japanese Industrial Standard (JIS) Z8741-Method-2, at an angle of incidence of 60 degrees and at an angle of reception of 60 degrees.

Examples 1 to 3 and Comparative Examples 1 to 7

In each of Examples 1 to 3 and Comparative Examples 1 to 7, the following component materials were employed.

(1) A crystalline ethylene-propylene block copolymer (A) was selected from those having the melt flow rate (MFR), the mmmm and the copolymerized ethylene content shown in Table 1.

TABLE 1

| Crystalline ethylene-propylene block copolymer (A) | | | | | |
|---|---|---|---|---|---|
| Type of copolymer (A) | PP-1 | PP-2 | PP-3 | PP-4 | PP-5 |
| MFR (g/10 min.) | 60 | 62 | 59 | 60 | 35 |
| mmmm (%) | 97.5 | 97.6 | 97.5 | 94.7 | 97.8 |
| Copolymerized ethylene content (at %) | 3.3 | 0.3 | 20.2 | 3.4 | 3.3 |

(2) An ethylene-octene-1 copolymer (B) was selected from the following copolymers.

R-1: An ethylene-a-olefin copolymer prepared by using a polymerization single site catalyst and having a copolymerized octene-1 content of 7.3 molar %, a Mw/Mn ratio of 2.1, a $MI_{2.16}$ of 5 g/10 minutes and a $MI_{10}/MI_{2.16}$ ratio of 7.2.

R-2: An ethylene-hexene-1 copolymer prepared by using a polymerization single site catalyst and having a copolymerized hexene-1 content of 11.5 molar %, a Mw/Mn ratio of 2.0, a $MI_{2.16}$ of 3 and a $MI_{10}/MI_{2.16}$ ratio of 7.1.

R-3: An ethylene-butene-1 copolymer prepared by using a conventional polymerization vanadium catalyst and having a copolymerized butene-1 content of 14.3 molar %, a Mw/Mn ratio of 5.5, a $MI_{2.16}$ of 1.5 and a $MI_{10}/MI_{2.16}$ ratio of 2.1.

R-4: An ethylene-propylene copolymer prepared by using a conventional polymerization vanadium catalyst and having a copolymerized propylene content of 16.6 molar %, a Mw/Mn ratio of 2.2, a $MI_{2.16}$ of 0.6 and a $MI_{10}/MI_{2.16}$ ratio of 5.4.

(3) A talc particle component (C) was selected from:

T-1: Talc particles having an average particle size of 4 μm.
T-2: Talc particles having an average particle size of 8 μm.

(4) An additive comprises 0.1 part by weight of 2,6-di-tert-butyl-4-methylphenol, 0.2 part by weight of tetrakis-[methylene-3-(3',5'-di-tert-butyl-4'-hydroxyphenyl)propionate]methane, and 0.2 part by weight of bis-(2,2,6,6-tetramethyl-4-piperidyl) sebacate per 100 parts by weight of the resin composition.

(5) A pigment comprises 0.7 part by weight of iron oxides and 0.3 part by weight of titanium dioxide.

In each of Examples 1 to 3 and Comparative Examples 1 to 7, the components (A), (B) and (C) of the types indicated in Table 2 were blended in the amounts indicated in parentheses in Table 2 with the above-mentioned types and amounts of additive and pigment by using a tumbler mixer, and the blend was melt-kneaded and then pelletized by using a biaxial knead-extruder. The pellets were molded into specimens by using an injection molding machine. The specimens were employed in the above-mentioned tests.

The test results are shown in Table 2.

TABLE 2

Compositions of resin compositions and test results

| | | Example No. | | | | | | | | | |
|---|---|---|---|---|---|---|---|---|---|---|---|
| | | Example | | | Comparative Example | | | | | | |
| Item | | 1 | 2 | 3 | 1 | 2 | 3 | 4 | 5 | 6 | 7 |
| Component (A) | (wt %) | PP-1 (60) | PP-1 (60) | PP-1 (55) | PP-1 (60) | PP-1 (60) | PP-2 (60) | PP-3 (60) | PP-4 (60) | PP-5 (60) | PP-1 (60) |
| Component (B) | | R-1 (30) | R-2 (30) | R-1 (25) | R-3 (30) | R-4 (30) | R-1 (30) | R-1 (30) | R-1 (30) | R-1 (30) | R-1 (30) |
| Component (C) | | T-1 (10) | T-1 (10) | T-1 (20) | T-1 (10) | T-1 (10) | T-1 (10) | T-1 (10) | T-1 (10) | T-1 (10) | T-2 (10) |
| MFR | g/10 min. | 20 | 19 | 15 | 18 | 19 | 20 | 16 | 20 | 13 | 21 |
| TYS | MPa | 20.5 | 20.6 | 21.6 | 18.0 | 20.2 | 24.6 | 14.0 | 19.4 | 20.4 | 20.1 |
| FM | MPa | 1600 | 1620 | 1880 | 1400 | 1600 | 1700 | 1200 | 1380 | 1550 | 1540 |
| IZOD | J/m | 80.5 | 79.8 | 115.7 | 81.5 | 61.4 | 45.1 | 112.6 | 80.2 | 82.6 | 77.6 |
| HDT | °C. | 130 | 131 | 136 | 120 | 130 | 135 | 108 | 120 | 129 | 129 |
| RH | R-scale | 60 | 62 | 65 | 48 | 59 | 65 | 30 | 45 | 59 | 58 |
| BT | °C. | −35 | −31 | −30 | −38 | −18 | −5 | −40 | −32 | −36 | −35 |
| Moldability | cm | 122 | 119 | 113 | 105 | 110 | 125 | 103 | 123 | 98 | 115 |
| Gloss | % | 78 | 79 | 60 | 60 | 75 | 80 | 50 | 73 | 72 | 77 |

Table 2 clearly shows that the polypropylene resin compositions of Examples 1 to 3 in accordance with the present invention were satisfactorily in all the tested properties, whereas the shaped specimens of the resin compositions of Comparative Examples 1, 4 and 5 had unsatisfactory surface hardness, flexural modulus of elasticity and thermal deformation resistance, the resin composition of Comparative Example 6 had an unsatisfactory moldability (melt flowability), and the resin composition and shaped specimen of Comparative Example 7 were unsatisfactory in MFR, TYS, FM, IZOD, HDT and RH.

The polypropylene resin composition of the present invention comprising a specific ethylene-α-olefin copolymer component (B) mixed with a crystalline ethylene-propylene block copolymer component (A) and a specific talc component (C) exhibits a high melt flowability (moldability) and is capable of forming therefrom shaped articles having excellent surface hardness, thermal deformation resistance and impact resistance at low temperature and a good appearance without flowmark formation.

Accordingly, the polypropylene resin composition of the present invention is useful for external parts of automobiles, particularly large and thin bumpers which can be produced only from a resin composition having a high melt-flowability.

We claim:

1. A polypropylene resin composition for the exterior parts of automobiles, comprising:

(A) 35 to 74% by weight of a crystalline ethylene-propylene block copolymer having a content of copolymerized ethylene of 0.5 to 15% by weight, an isotactic pentad fraction (mmmm) of copolymerized propylene of 96% or more, and a melt flow rate of 40 to 80 g/10 minutes determined at a temperature of 230° C. under a load of 2160 g;

(B) 21 to 40% by weight of an ethylene-α-olefin copolymer prepared by a catalytic polymerization in the presence of a single site catalyst, containing 70 molar % or less of copolymerized α-olefin, and having a molecular weight distribution ratio (Mw/Mn) of a weight-average molecular weight (Mw) to a number-average molecular weight (Mn) of 2.5 or less, and a melt flow index ratio ($MI_{10}/MI_{2.16}$) of a melt flow index ($MI_{10}$) determined at 190° C. under a load of 10 kg to a melt flow index ($MI_{2.16}$) determined at a temperature of 190° C. under a load of 2.16 kg of 6 to 15; and (C) 5 to 25% by weight of talc particles having an average particle size of 3 to 7 μm, determined by a laser diffraction method.

2. The polypropylene resin composition as claimed in claim 1, wherein the α-olefin copolymerized in the ethylene-α-olefin copolymer (B) is selected from 1-olefins having 3 to 12 carbon atoms.

3. The polypropylene resin composition as claimed in claim 1, wherein the single site catalyst comprises at least one member selected from metallocene compounds of transition metals of groups IV and V of the periodic Table and at least one member selected from the group consisting of organic aluminum compounds and ionic organic compounds.

4. The polypropylene resin composition as claimed in claim 1, having a melt flow rate of 10 g/10 minutes or more, determined at a temperature of 230° C. under a load of 2160 g, a flexural modulus of elasticity of 1560 MPa or more, a tensile yield strength of 19 MPa or more, an Izod impact strength at −30° C. of 70 J/m or more, a thermal deformation temperature of 125° C. or more, a surface hardness of 55 or more, a brittle temperature of −25° C. or lower, and a melt flowability (moldability) of 100 cm or more.

* * * * *